United States Patent [19]
Ahne et al.

[11] Patent Number: 5,278,277
[45] Date of Patent: Jan. 11, 1994

[54] PHENYLQUINOXALINE COPOLYMERS

[75] Inventors: Hellmut Ahne, Roettenbach; Lothar Zapf, Alzenau, both of Fed. Rep. of Germany

[73] Assignee: Siemens Aktiengesellschaft, München, Fed. Rep. of Germany

[21] Appl. No.: 982,191

[22] Filed: Nov. 25, 1992

[30] Foreign Application Priority Data

Nov. 26, 1991 [DE] Fed. Rep. of Germany ....... 4138862

[51] Int. Cl.$^5$ .............................................. C08G 73/06
[52] U.S. Cl. ..................................... 528/128; 528/10;
528/125; 528/176; 528/182; 528/183; 528/184;
528/185; 528/188; 528/220; 528/228; 528/229;
528/422; 528/423
[58] Field of Search ............... 528/128, 185, 182, 183,
528/188, 125, 176, 184, 220, 229, 423, 422

[56] References Cited

U.S. PATENT DOCUMENTS

| | | | |
|---|---|---|---|
| 3,852,243 | 12/1974 | Hergenrother | 528/125 |
| 3,852,244 | 12/1974 | Heath et al. | 528/125 |
| 4,304,898 | 12/1981 | Rabilloud et al. | 528/229 |
| 4,375,536 | 3/1983 | Hergenrother | 528/229 |
| 4,595,745 | 6/1986 | Nakano et al. | 528/229 |
| 4,788,271 | 11/1988 | Hergenrother et al. | 528/125 |
| 4,908,426 | 3/1990 | Hergenrother et al. | 528/125 |
| 4,914,177 | 4/1990 | Fang | 528/229 |
| 5,030,704 | 7/1991 | Harris et al. | 528/229 |
| 5,096,999 | 3/1992 | Hellmut et al. | 528/182 |
| 5,115,078 | 5/1992 | Harris et al. | 528/229 |
| 5,149,773 | 9/1992 | Chiang et al. | 528/423 |
| 5,162,495 | 11/1992 | Chiang et al. | 528/423 |
| 5,175,221 | 12/1992 | Chiang et al. | 528/423 |

FOREIGN PATENT DOCUMENTS

0420417 4/1991 European Pat. Off. .

OTHER PUBLICATIONS

Societe Francaise Des Ingenieurs Plasticiens—SFIP, Proceedings/Abstracts of First European Technical Symposium on Polyimides, vol. 1, May 10–11, 1989.
Watari, T. et al., "Packing Technology for the NEC SX Supercomputer", IEEE (1985), pp. 192–198.
Schiltz, A., et al., "Fabrication of High Density Hybrid Multilayer Systems Using a Polyphenylquinoxaline Polymer As Dielectric".

Primary Examiner—John Kight, III
Assistant Examiner—P. Hampton-Hightower
Attorney, Agent, or Firm—Kenyon & Kenyon

[57] ABSTRACT

Phenylquinoxaline copolymers of the general formula:

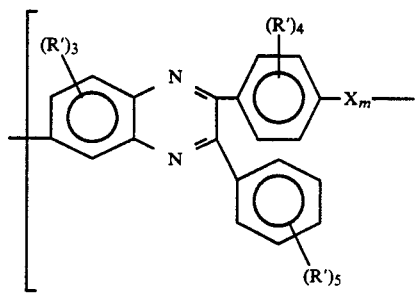

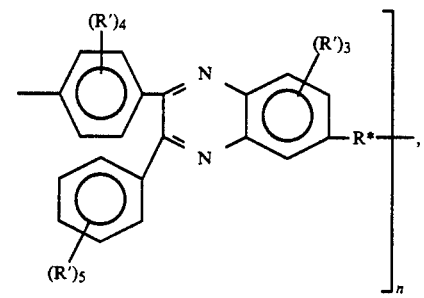

are described where R* signifies a polar unit. The application of these copolymers for producing highly heat-resistant dielectrics is also described.

3 Claims, No Drawings

PHENYLQUINOXALINE COPOLYMERS

FIELD OF THE INVENTION

The invention relates to phenylquinoxaline copolymers having polar partial structures, and to their use in the production of highly heat-resistant dielectrics.

BACKGROUND OF THE INVENTION

When applied as dielectrics for multilayer interconnections having a high switching rate, polyphenylquinoxalines demonstrate better thermal and electrical properties than conventional, highly heat-resistant protective and insulation layers based on polyimide (c.f.: 35th Electronic Components Conference, Washington (U.S.), May 20–22 (1985) Conference Report 1985, pp. 192–198); (c.f.: First European Technical Symposium on Polyimides, Montpellier, May 10–11 (1989) - Proceedings vol. 1, pp. B-2/1–B-2/12). In order for the polymers to be processed into the required thin layers, they must be soluble in those solvents which can be applied in production lines without adversely affecting the environment. Another requirement is that the polymer layers must adhere well to the substrates used in microelectronics. However, neither of these two requirements is met by polyphenylquinoxalines. These polymers are soluble only in very toxic, phenolic solvents, such as cresol or chlorinated hydrocarbons, and demonstrate insufficient adherence to typical semiconductor surfaces, such as silicon oxide and silicon nitride.

SUMMARY OF THE INVENTION

The object of the invention is to provide polymers, which can be used to produce highly heat-resistant organic dielectrics having good thermal and electrical properties and which can be processed thereby in non-toxic solvents.

This is achieved according to the invention by means of phenylquinoxaline copolymers, which have polar partial structures and are of the following general formula:

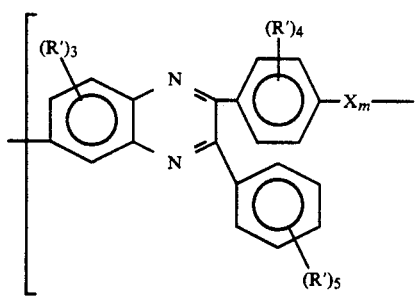

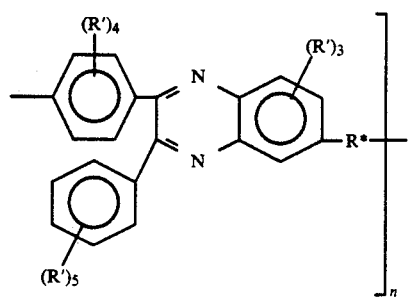

where $m=0$ or 1, and $n=1$ to 10, where the following applies:

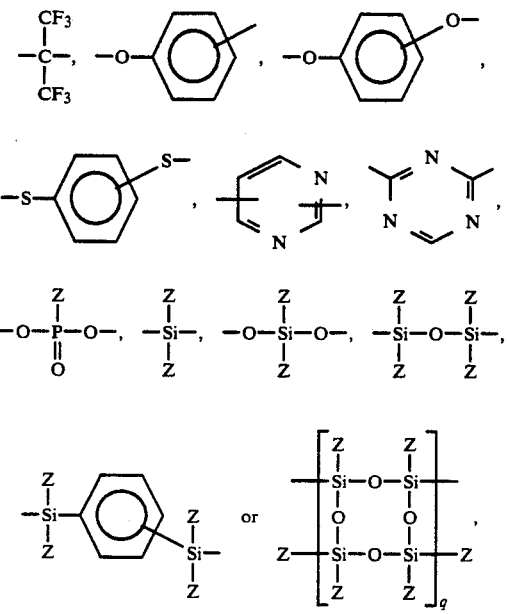

where $p=1$ to 18 and $q=1$ to 10, and $Z=$ alkyl with 2 through 10 C-atoms or aryl;

$R'=$ H, F or Cl;

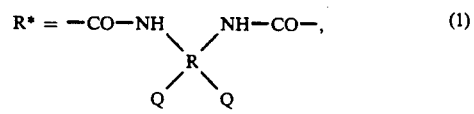

where $Q=$ H or $OR''$, where $R''$ is hydrogen (H) or an olefinically unsaturated residue, and where the residue $R'$ on the aromatic grouping adjacent to the CO group can be a COOH group,

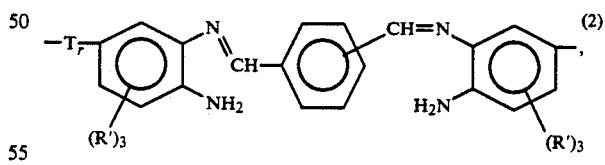

where $r=0$ or 1, and $T=$ —O—, —CO— or

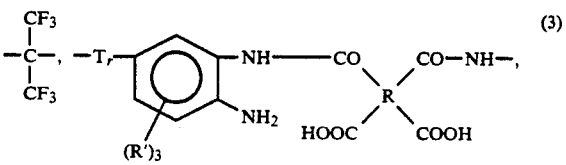

where the following applies:

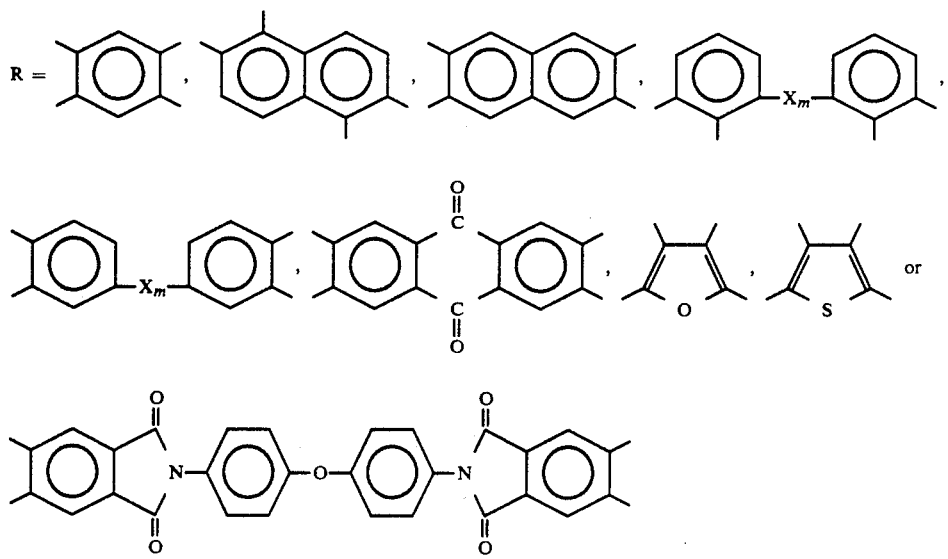

DETAILED DESCRIPTION OF THE INVENTION

Besides phenylquinoxaline structures, the copolymers according to the invention exhibit precursors of oxazoles (1), imides (1), imidazoles (2) and so-called pyrones (3), that is imidazopyrrolones as co-components having polar partial structures. While substantially retaining the good thermal and electrical properties of polyphenylquinoxalines, these copolymers demonstrate good solubility in common non-toxic solvents, such as γ-butyrolactone and N-methylpyrrolidone, as well as a good adhesion to semiconductor substrates, such as silicon oxide and silicon nitride. The processibility in non-toxic solvents and the improved adhesion to semiconductor substrates are achieved by introducing the polar partial structures.

The copolymers according to the invention cyclize when heated to approximately 400° C. and—under the formation of benzoxazole-, imide-, benzimidazole- and pyrone partial structures—become insoluble in all organic solvents. Surprisingly, the good thermal and electrical property spectrum of polyphenylquinoxaline is retained after the cyclization. Therefore, these copolymers are extremely well suited for producing highly heat-resistant dielectrics. Compared to polyimides, another advantage is that the reduction in the layer thickness amounts merely to 10 to 20% and, consequently, clearly lies under the 30 to 50% of the polyimides.

Another advantage of the copolymers according to the invention is that photosensitive precursors are able to be produced by introducing photochemically reactive groups, for example by adding unsaturated epoxides to OH-, $NH_2$- or COOH groups. R" thereby preferably represents one of the following olefinically unsaturated residues:

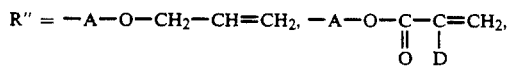

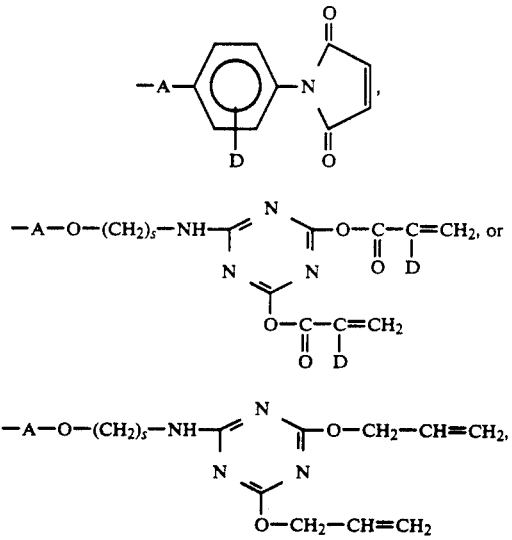

where
$A = -CH_2-$ and $-CH_2-O-[(CH_2)_s-O]_t-(CH_2)_3-$.
$D = H, CH_3, Cl, Br$ and $CN$,
and
$s = 2$ to 16,
$t = 1$ to 10.

As already explained, the cyclization of the copolymers according to the invention leads to copolymers with benzoxazole-, imide-, benzimidazole- or pyrone units. These copolymers have the following structure, for example:

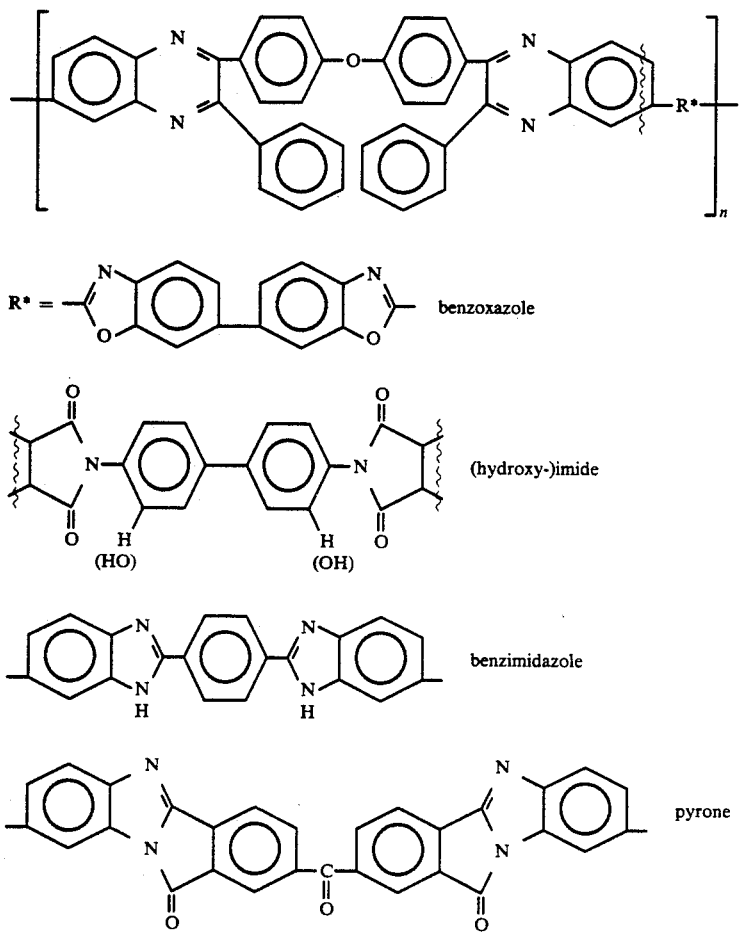

When copolymers with imide structures, are prepared the residue R' which is on the aromatic grouping adjacent to the CO-NH group, must be a COOH group. This means that, in this case, the aromatic grouping merely exhibits two residues R', which are H, F or Cl.

Exemplary embodiments of the invention will be described in greater detail in the following Examples.

EXAMPLE 1

Copolymer of Phenylquinoxaline and of a Benzoxazole Precursor

By condensing oxydibenzil (1 mole) with 3,4diaminobenzoic acid (2 moles), a dicarboxylic acid with phenylquinoxaline units is obtained. The corresponding acid chloride is prepared from this dicarboxylic acid. Thionyl chloride can be used for this purpose. The dicarboxylic acid chloride is subsequently reacted with 3,3'-dihydroxy-4,4'diaminobiphenyl (1 mole) to form a copolymer that has both phenylquinoxaline units, as well as o-hydroxy-amide groupings (CO-NH-). The copolymer can also be prepared by means of a so-called chloride-free synthesis (c.f. U.S. Pat. No. 5,096,999).

Resist films are able to be produced from a solution of the copolymer. They split off water when annealed at approximately 400° C., whereby the o-hydroxy-amide groupings cyclize into benzoxazole structures.

EXAMPLE 2

Copolymer of Phenylquinoxaline and of an Imide Precursor

One proceeds in accordance with Example 1, where in place of 3,4-diaminobenzoic acid, 4,5-diaminophthalic acid is used, and in place of 3,3'-dihydroxy-4,4'-diaminobiphenyl, 4.4'- diaminobiphenyl is used. Via tetracarboxylic acid, or the corresponding acid chloride, as an intermediate stage, a copolymer with phenylquinoxaline units and o-carboxyamide groupings (-CO-NH-) is thereby obtained. When annealed to approximately 400° C., they cyclize into imide structures.

If in place of 4,4'- diaminobiphenyl, 3,3'-dihydroxy4,4'-diaminobiphenyl is used, a copolymer with hydroxyimide structures is obtained in a corresponding manner.

EXAMPLE 3

Copolymer of Phenylquinoxaline and of a Benzimidazole Precursor

By condensing oxydibenzil and isophthalaldehyde (molar ratio 1:1) with the double molar quantity 3,3',4,4'-tetraaminobiphenyl in a suitable solvent, such as N-methylpyrrolidone, one obtains a soluble copolymer that exhibits both phenylquinoxaline units as well as o-amino-azomethine groupings (—N═CH—).

The copolymer is able to be processed into films. When the polymer films are annealed at approximately 400° C., the o-amino-azomethine groupings are cyclized into benzimidazole structures.

EXAMPLE 4

Copolymer of Phenylquinoxaline and of a Pyrone Precursor 3,3',4,4'-Tetraaminobiphenyl and benzophenone tetracarboxylic acid dianhydride are converted in the molar ratio of 6:1 into an oligomeric amidocarboxylic acid having terminal o-diamino functions. This amidocarboxylic acid is subsequently condensed with oxydibenzil in the molar ratio 6:5 into a copolymer that has both phenylquinoxaline units as well as o-amino-o'-carboxy- amide groupings (—CO—NH—).

Films produced from the copolymer split off water when annealed at approximately 400° C., whereby the o-amino-o'-carboxy-amide groupings cyclize into pyrone structures.

All of the above-described copolymers are very good soluble in strong polar solvents, such as dimethyl formamide, dimethylsulfoxide, dimethylacetamide and N-methylpyrrolidone. The substrates, for example silicone wafers, are coated with solutions of the copolymers in N-methylpyrrolidone using a spinon deposition process. The resist films were dried for 1 h at approximately 70° C. and subsequently annealed for 1 h at approximately 400° C.

Contrary to the phenylquinoxaline polymers, a loss in layer thickness occurs in the case of the copolymers during the annealing process. This is because, in this case, non-cyclized prepolymer units are present in part, which are only converted into the highly heat resistant structures after undergoing the annealing process (400° C./1 h). The volume shrinkage of approximately 10 to 20% which occurs is clearly less than it is for polyimides (30 to 50%).

Compared to polyimides, the copolymers according to the invention are distinguished by a clearly higher thermal resistance. A loss in weight does not occur until a temperature of above 500° C. The thermal characteristic was determined thermogravimetrically, where the copolymers were heated at a heating rate of 10° C./min from room temperature to 700° C., and the loss in weight was recorded.

The copolymers according to the invention demonstrate very good insulation properties. The following characteristic electrical values were determined:

| Copolymer | ε | tan δ × 10³ | ρ(Ω × cm) |
|---|---|---|---|
| Example 1 | 3.03 | 1.3 | 1.3 × 10¹⁸ |
| Example 3 | 3.33 | 3.25 | 7 × 10¹⁷ |
| Example 4 | 3.08 | 2.0 | 1.6 × 10¹⁸ |

The dielectric properties were determined by taking a capacitance measurement at 25° C. (atmospheric humidity: 0%) at a measuring frequency of 1 kHz. A polymer film was applied to a Cr/Ni-coated silicone wafer, and a gold layer was vapor-deposited on as a counterelectrode; the film thickness amounted to approx. 6 μm.

With respect to the thermal and dielectric characteristic values, the copolymers according to the invention behave similarly to the phenylquinoxaline polymers. In addition, because of the solubilizing OH-, NH₂- and COOH-groups, these copolymers demonstrate a good solubility in non-toxic solvents, such as γ-butyrolactone and N-methylpyrrolidone. At the same time, the polar groups in the copolymers result in an improvement in the bonding properties on substrate surfaces, such as $SiO_2$ and $Si_3N_4$.

Furthermore, the copolymers according to the invention have the advantage of being receptive to a photostructuring process. This can take place indirectly using a two-layer technique with $O_2$/RIE, or directly with photosensitively adjusted precursors. Mixtures composed of the copolymers, which contain chemically bonded, photoreactive groups, and of sensitizers and/or photoinitiators are applied, whereby a positive or negative structuring with light follows, preferably with a wavelength of >400 nm. As sensitizers, one can apply compounds based on diazochinone, or rather diazoketone, for example, as employed in conventional positive resists.

What is claimed is:

1. A phenylquinoxaline copolymer having polar partial structures of the general formula:

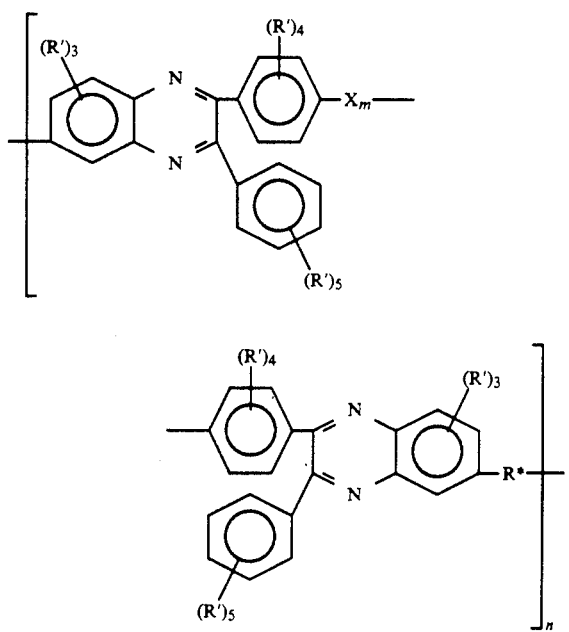

where
M=0 or 1 and n=1 to 10,
where:

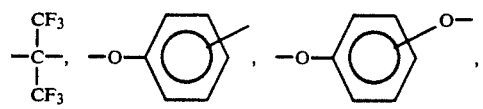

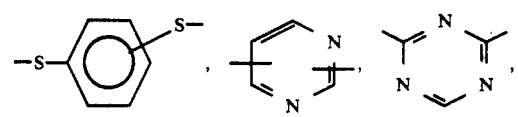

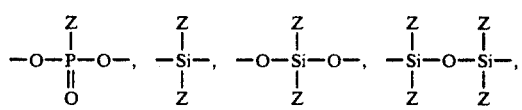

-continued

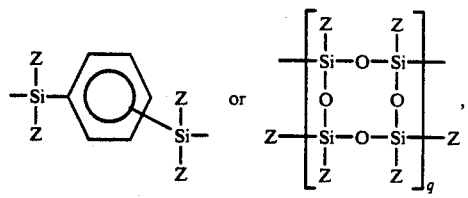

where p=1 to 18 and q=1 to 10,
and Z=alkyl with 1 to 10 C-atoms or aryl;
R'=H, F or Cl;

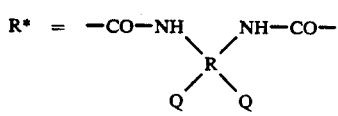

where Q=H or OR",
where R" is hydrogen (H) or an olefinically unsaturated residue, and where the residue R' on the aromatic grouping adjacent to the CO group can be a COOH group,

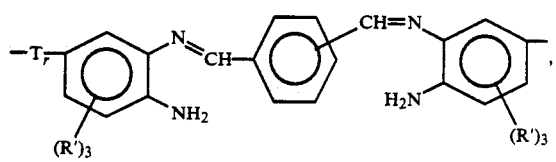

where r=0 or 1,
and T=—O—, —CO— or

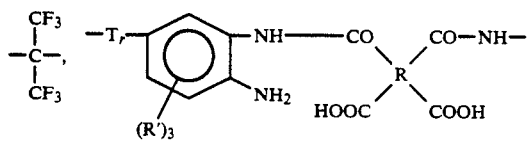

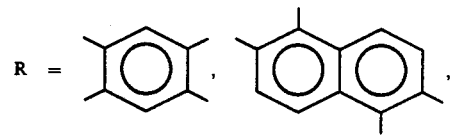

where:

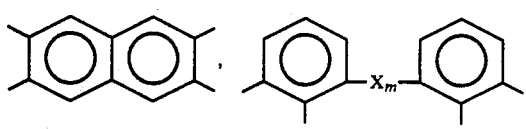

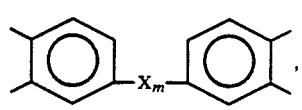

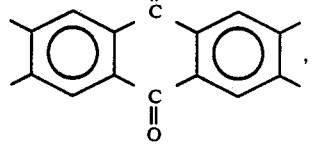

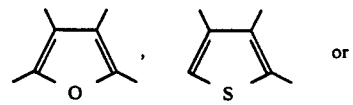

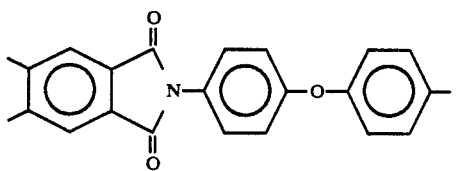

2. The phenylquinoxaline copolymer according to claim 1, wherein R" is:

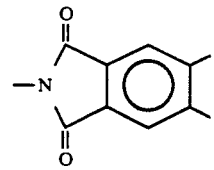

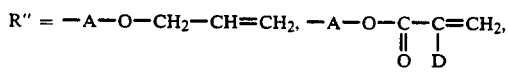

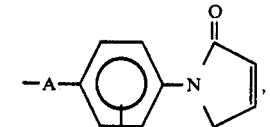

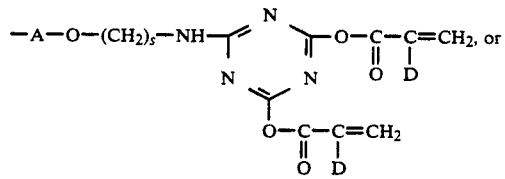

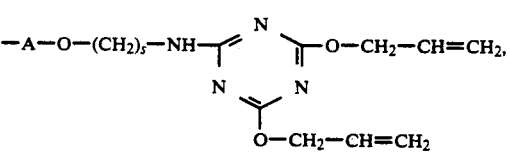

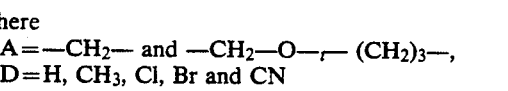

where
A=—CH$_2$— and —CH$_2$—O—$_t$—(CH$_2$)$_3$—,
D=H, CH$_3$, Cl, Br and CN
and
s=2 to 16
t=1 to 10.

3. Highly heat-resistant dielectrics produced from phenylquinoxaline copolymers according to claim 1.

* * * * *